(12) United States Patent
Chiu

(10) Patent No.: US 6,409,950 B1
(45) Date of Patent: Jun. 25, 2002

(54) METHOD OF MAKING A HOLLOW ORNAMENTAL KNOTTED ARTICLE

(76) Inventor: Yung-Chang Chiu, No. 143, Chi-Kuang St., Taichung City (TW)

( * ) Notice: Subject to any disclaimer, the term of this patent is extended or adjusted under 35 U.S.C. 154(b) by 77 days.

(21) Appl. No.: 09/668,528

(22) Filed: Sep. 21, 2000

(51) Int. Cl.⁷ .......................... B29C 33/76; B29C 70/30
(52) U.S. Cl. ...................... 264/103; 264/219; 264/257; 264/317
(58) Field of Search ................. 264/103, 219, 264/317; 26/257

(56) References Cited

U.S. PATENT DOCUMENTS

| | | | | |
|---|---|---|---|---|
| 3,619,448 A | * | 11/1971 | Matlock et al. ............. | 264/103 |
| 4,576,770 A | * | 3/1986 | Schultz ....................... | 264/103 |
| 4,863,660 A | * | 9/1989 | Cahuzac et al. ............. | 264/317 |
| 5,624,618 A | * | 4/1997 | Forman et al. ............. | 264/317 |

* cited by examiner

Primary Examiner—Allan R. Kuhns
(74) Attorney, Agent, or Firm—Christie, Parker & Hale, LLP

(57) ABSTRACT

A method of making a hollow ornamental knotted article includes: forming a thread into a loose knotting which confines a hollow space; wrapping a solvent-soluble filler with a protective material, and inserting the wrapped filler into the hollow space; tightening the thread so as to tie tightly the wrapped filler and adjust the loose knotting into a tight knotting; applying a shape-setting liquid to the tight knotting so as to set the profile of the tight knotting; and injecting a solvent into the filler through the protective material to dissolve the filler, and drawing out the dissolved filler and the protective material from the hollow space, thus forming a hollow ornamental knotting.

9 Claims, 5 Drawing Sheets

METHOD OF MAKING A HOLLOW ORNAMENTAL KNOTTED ARTICLE

BACKGROUND OF THE INVENTION

1. Field of the Invention

The invention relates to a method of making a hollow ornamental knotted article, more particularly to a method of making an oriental knotting that is very different from conventional ones.

2. Description of the Related Art

Oriental knottings make nice ornaments. FIG. 1 shows a conventional oriental knotting 1. As shown, the oriental knotting 1 is typically flat. Hence, it can be viewed only from the front or from the back. It would be desirable to make an oriental knotting that is very different from typical ones so as to enhance the ornamental aspect thereof.

SUMMARY OF THE INVENTION

Therefore, the object of the present invention is to provide a method of making a hollow ornamental knotted article.

According to one aspect of the present invention, a method of making a hollow ornamental knotted article comprises the steps of: forming a thread into a loose knotting which confines a hollow space; wrapping a solvent-soluble filler with a protective material, and inserting the wrapped filler into the hollow space; tightening the thread so as to tie tightly the wrapped filler and adjust the loose knotting into a tight knotting; applying a shape-setting liquid to the tight knotting so as to set the profile of the tight knotting; and injecting a solvent into the filler through the protective material to dissolve the filler, and drawing out the dissolved filler and the protective material from the hollow space, thus forming a hollow knotting.

According to another aspect of the present invention, a hollow ornamental knotted article produced according to the aforementioned method comprises an oriental knotting which includes a hollow space, a pair of mats formed at left and right sides of the hollow space and each having a plurality of intersecting thread lines, and a plurality of connecting lines interconnecting and extending between the mats at top and bottom sides and at front and rear sides of the hollow space.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
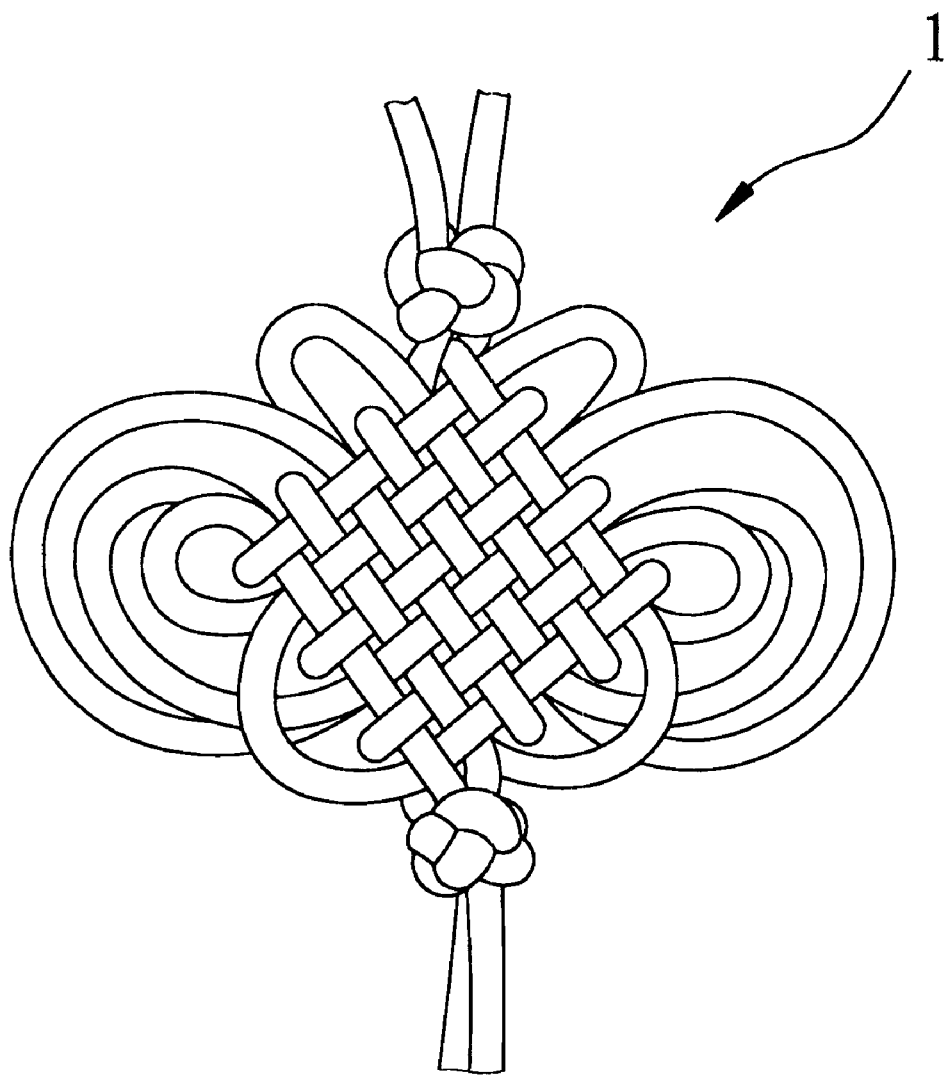
FIG. 1 is a perspective view of a conventional oriental knotting.
Figure 2:
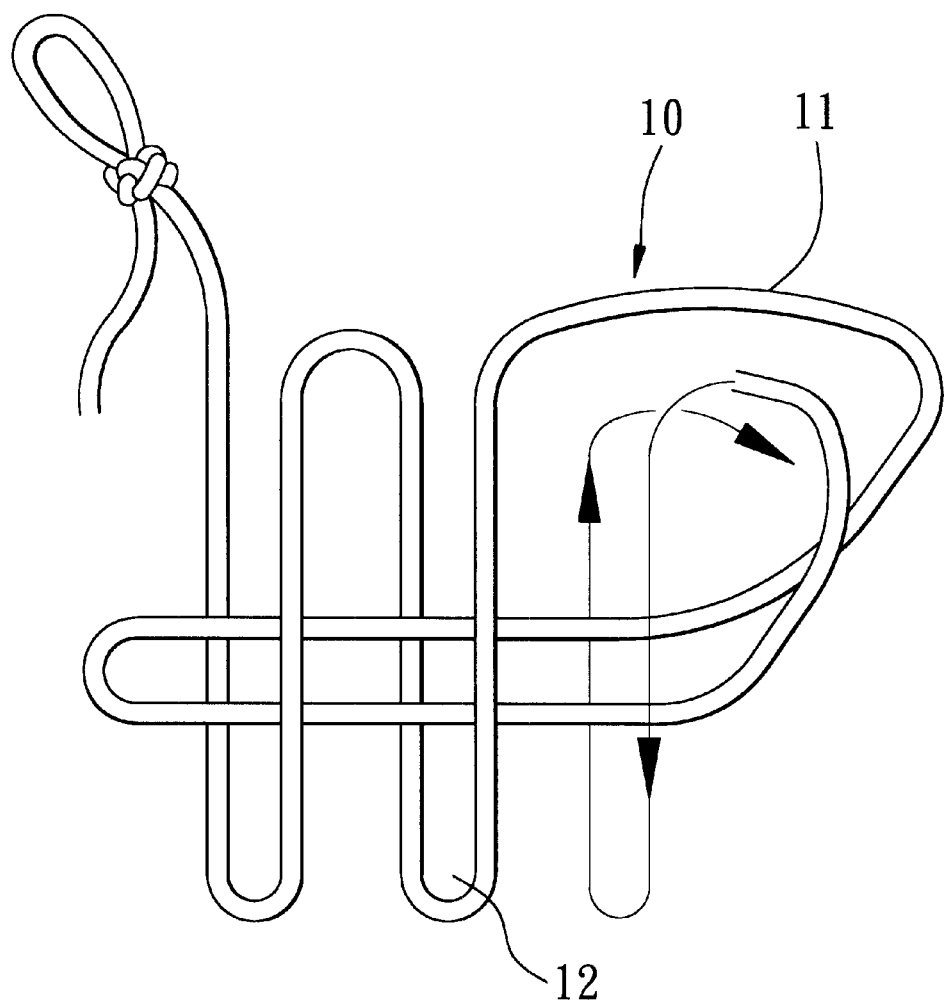
FIG. 2 is a schematic view of the preferred embodiment, illustrating the making of a loose knotting using a thread.
Figure 3:
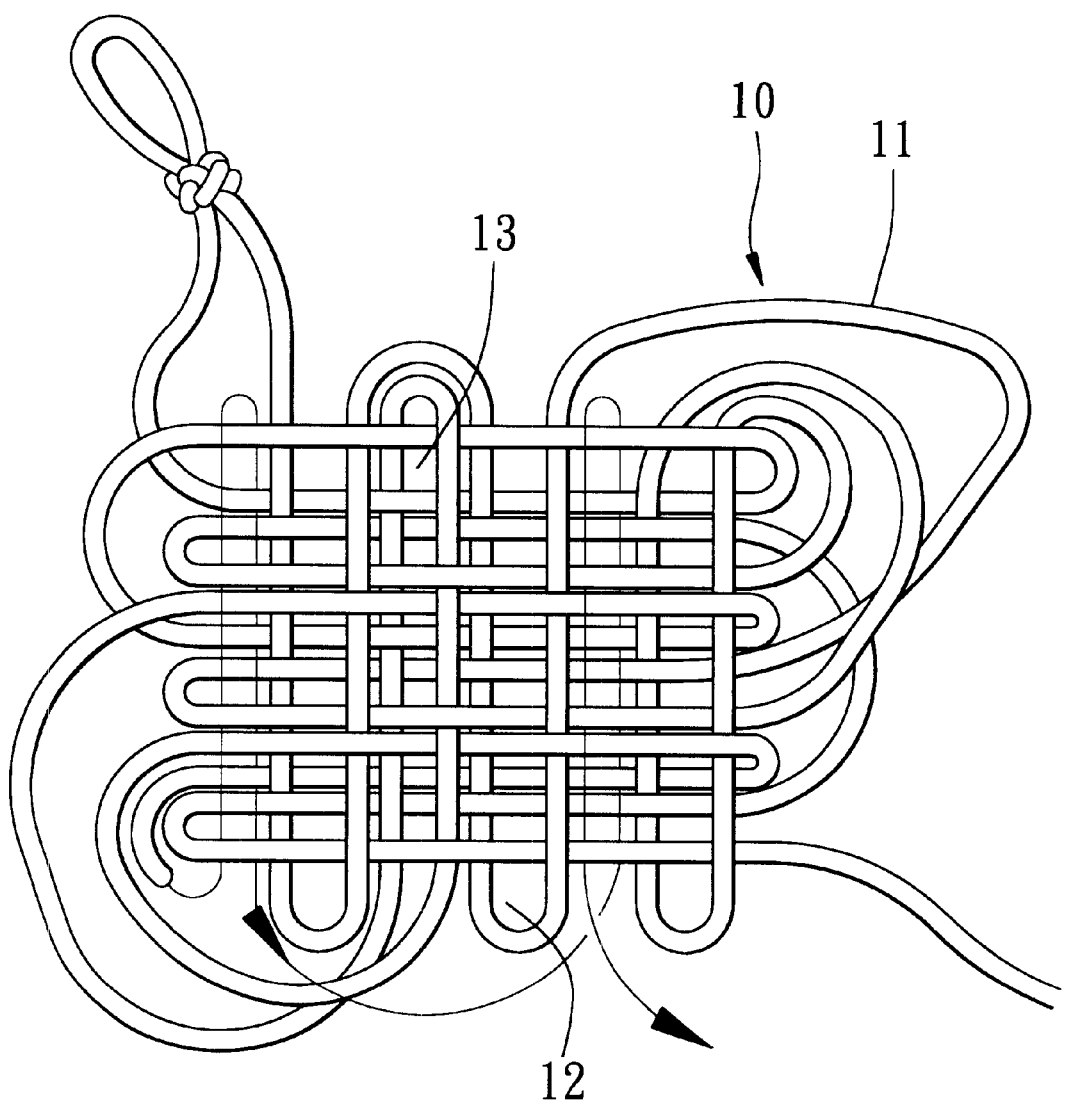
FIG. 3 is a schematic view of the preferred embodiment, further illustrating the making of the loose knotting.
Figure 4:
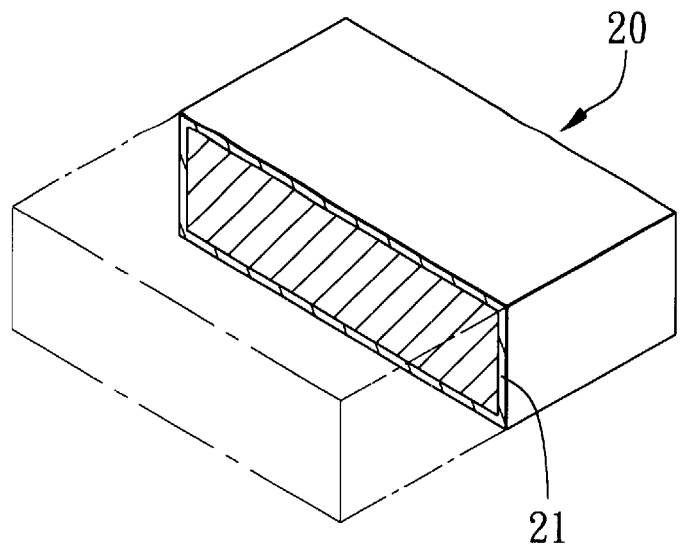
FIG. 4 is a perspective sectional view illustrating a filler of the preferred embodiment.
Figure 5:
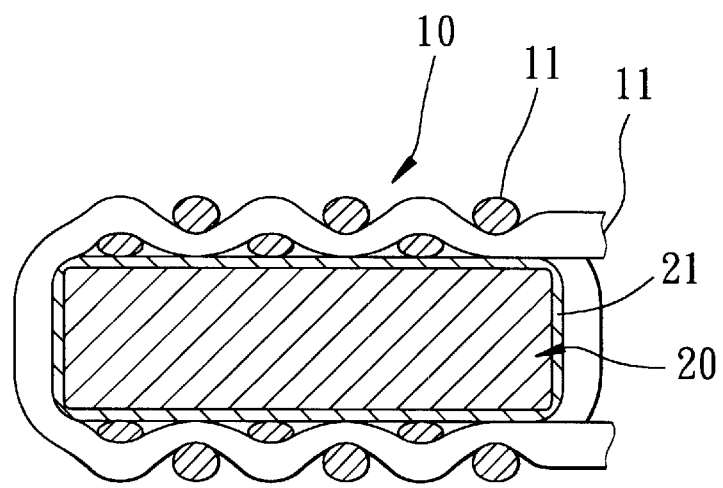
FIG. 5 is a schematic sectional view of the preferred embodiment, illustrating the filler in a hollow space of the knotting.
Figure 6:
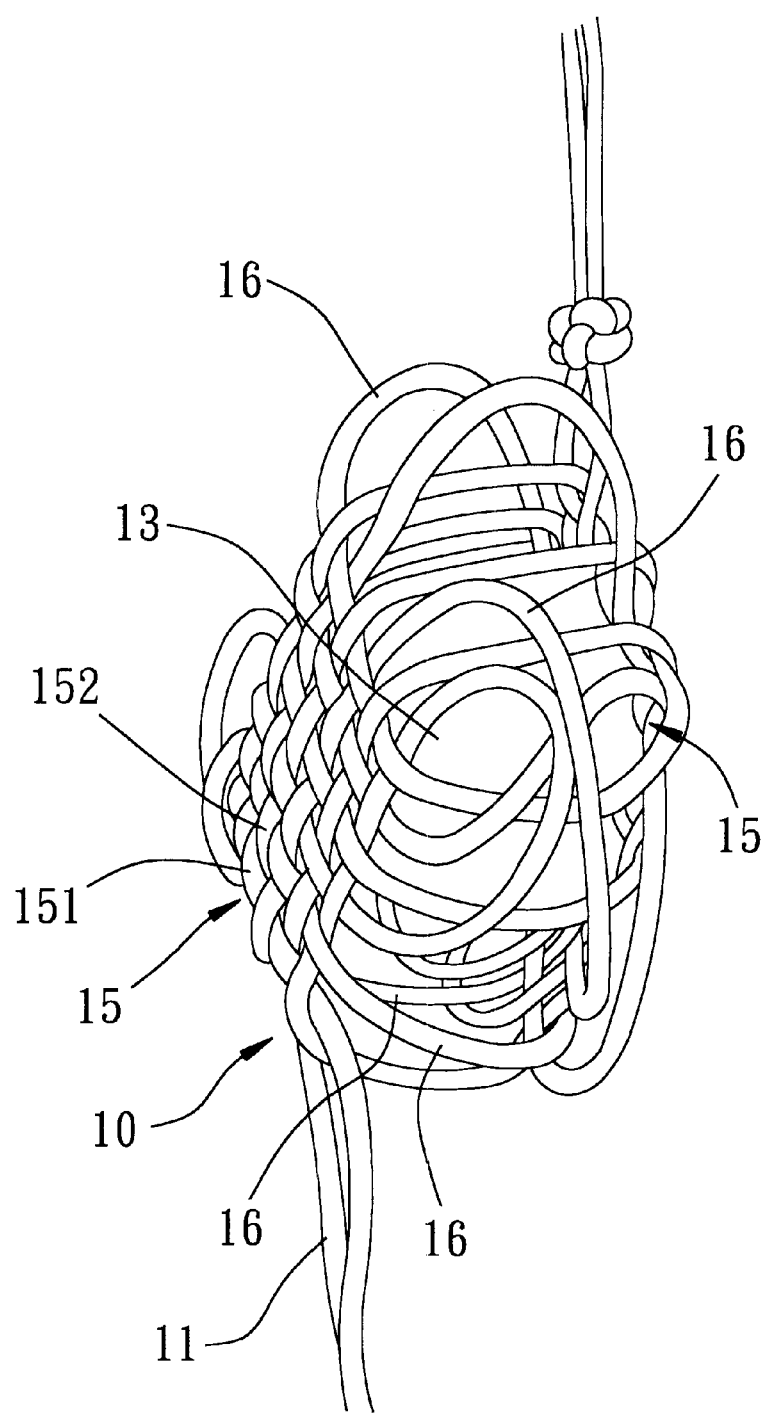
FIG. 6 is a perspective view illustrating a hollow ornamental knotted article formed by using the method of the present invention.

Referring to FIGS. 2 to 5, the preferred embodiment of a method of making a hollow ornamental knotted article according to the present invention is shown to include the step of forming a loose knotting 10 with a multiplicity of gaps using a thread 11 such that the loose knotting 10 confines thereinside a hollow space 13. The loose knotting 10 is an oriental knotting in this embodiment. A solvent-soluble filler 20 is wrapped with a protective material 21 and is inserted into the hollow space 13 via one of the gaps 12. In this embodiment, the filler 20 is styrofoam, and the protective material 21 is a polyethylene (PE) film. The thread 11 is then tightened so as to tie tightly the wrapped filler 20 and adjust the loose knotting 10 into a tight knotting 10. Then, a shape-setting liquid is applied to the tight knotting 10 so as to set the profile thereof. In this embodiment, the shape-setting liquid is a sprayable liquid containing a polymeric material, such as a hair fixing liquid. After the shape-setting liquid applied to the tight knotting 10 has dried, a solvent, such as toluene, is directly injected into the filler 20 with the use of a syringe (not shown) to dissolve the filler 20. Alternatively, a hole may be formed in the protective material 21, and a pipette may be used to drop the solvent into the filler 20 via the hole. Since the filler 20 is wrapped inside the protective material 21, the solvent will not come into contact with the thread 11, which can otherwise result in discoloration of the thread 11. After the filler 20 has completely dissolved in the solvent, the protective material 21 together with the residual filler 20 are drawn out from the hollow space 13 via one of the gaps 12, without affecting the profile of the tight knotting 10, and a hollow ornamental knotting is thus formed, as shown in FIG. 6.

The hollow ornamental knotted article produced according to the aforementioned method comprises an oriental knotting 10 which includes the hollow space 13, a pair of mats 15 formed at left and right sides of the hollow space 13 and each having a plurality of intersecting thread lines 151, 152, and a plurality of connecting lines 16 interconnecting and extending between the mats 15 at top and bottom sides and at front and rear sides of the hollow space 13.

A hollow ornamental knotting product thus formed can be duplicated on a mass scale via an investment casting process using a moldable material, which may be selected from the group consisting of metals and plastics.

It can be appreciated from the foregoing that the hollow ornamental knotted article of the present invention has a unique stereometric configuration, unlike the conventional ornamental knottings of flat shape.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method of making a hollow ornamental knotted article, comprising:

forming a thread into a loose knotting which confines thereinside a hollow space;

wrapping a solvent-soluble filler with a protective material, and inserting the wrapped filler into the hollow space;

tightening the thread so as to tie tightly the wrapped filler and adjust the loose knotting into a tight knotting;

applying a shape-setting liquid to the tight knotting so as to set a profile of the tight knotting; and injecting a solvent into the filler through the protective material to dissolve the filler, and drawing out the dissolved filler and the protective material from the hollow space, thus forming a hollow knotted product.

2. The method of claim 1, wherein the loose knotting is an oriental knotting.

3. The method of claim 2, wherein the solvent is injected into the filler via a syringe.

4. The method of claim 3, wherein the filler is styrofoam.

5. The method of claim 4, wherein the solvent is toluene.

6. The method of claim 5, wherein the protective material is a polyethylene film.

7. The method of claim 6, wherein the shape-setting liquid is a sprayable liquid containing a polymeric material.

8. The method of claim 1, further comprising duplicating the hollow knotted product via an investment casting process by using a moldable material.

9. The method of claim 8, wherein the moldable material is selected from the group consisting of metals and plastics.

* * * * *